United States Patent
Kaltenbach et al.

(10) Patent No.: US 10,960,889 B2
(45) Date of Patent: Mar. 30, 2021

(54) GEAR-SHIFTING METHOD FOR AN ELECTRIC DRIVE SYSTEM

(71) Applicant: ZF Friedrichshafen AG, Friedrichshafen (DE)

(72) Inventors: Johannes Kaltenbach, Friedrichshafen (DE); Matthias Horn, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 59 days.

(21) Appl. No.: 16/291,362

(22) Filed: Mar. 4, 2019

(65) Prior Publication Data
US 2019/0270454 A1 Sep. 5, 2019

(30) Foreign Application Priority Data
Mar. 5, 2018 (DE) ...................... 10 2018 203 206.8

(51) Int. Cl.
*B60W 10/184* (2012.01)
*B60W 30/19* (2012.01)
*B60W 10/11* (2012.01)

(52) U.S. Cl.
CPC ............ *B60W 30/19* (2013.01); *B60W 10/11* (2013.01); *B60W 10/184* (2013.01); *B60W 2510/101* (2013.01); *B60W 2520/105* (2013.01); *B60W 2554/00* (2020.02); *B60W 2710/1005* (2013.01); *B60W 2710/18* (2013.01); *B60Y 2200/91* (2013.01)

(58) Field of Classification Search
CPC .... B60W 30/19; B60W 10/11; B60W 10/184; B60W 2554/00; B60W 2710/18; B60W 2520/105; B60W 2710/1005; B60W 2510/101; B60Y 2200/91; B60T 7/12; B60K 1/00

See application file for complete search history.

(56) References Cited

U.S. PATENT DOCUMENTS

| 6,126,251 A  * | 10/2000 | Yoshii ........................ B60L 7/26 303/152 |
| 7,469,178 B2 * | 12/2008 | Shiiba ............. B60W 30/18109 701/70 |
| 7,493,205 B2 | 2/2009 | Du et al. |
| 9,174,631 B2 * | 11/2015 | Heap ..................... B60W 10/18 |

(Continued)

FOREIGN PATENT DOCUMENTS

| DE | 102005019824 A1 | 1/2006 |
| DE | 102009002437 A1 | 10/2010 |

(Continued)

OTHER PUBLICATIONS

German Search Report DE102018203206.8 dated Sep. 7, 2018. (14 pages).

*Primary Examiner* — Justin Holmes
(74) *Attorney, Agent, or Firm* — Dority & Manning, P.A.

(57) ABSTRACT

A gear change method for an electric transmission system (1), the electric transmission system (1) including an electric machine (2), a multi-stage transmission (3) drivingly connected downstream from the electric machine (2) and having interruption of tractive force, and at least one brake (4) for braking a vehicle wheel (5), the method including transferring the brake (4) out of an inoperative condition into a readiness condition during a gear change operation of the transmission (3).

16 Claims, 2 Drawing Sheets

(56) References Cited

U.S. PATENT DOCUMENTS 9,822,860 B2 11/2017 Kaltenbach et al.
2011/0118920 A1* 5/2011 Kim .................. B60W 20/11
701/22

FOREIGN PATENT DOCUMENTS

| DE | 102013204227 A1 | 9/2014 |
| DE | 102014226386 A1 | 7/2016 |
| FR | 2928583 A1 | 9/2009 |

* cited by examiner

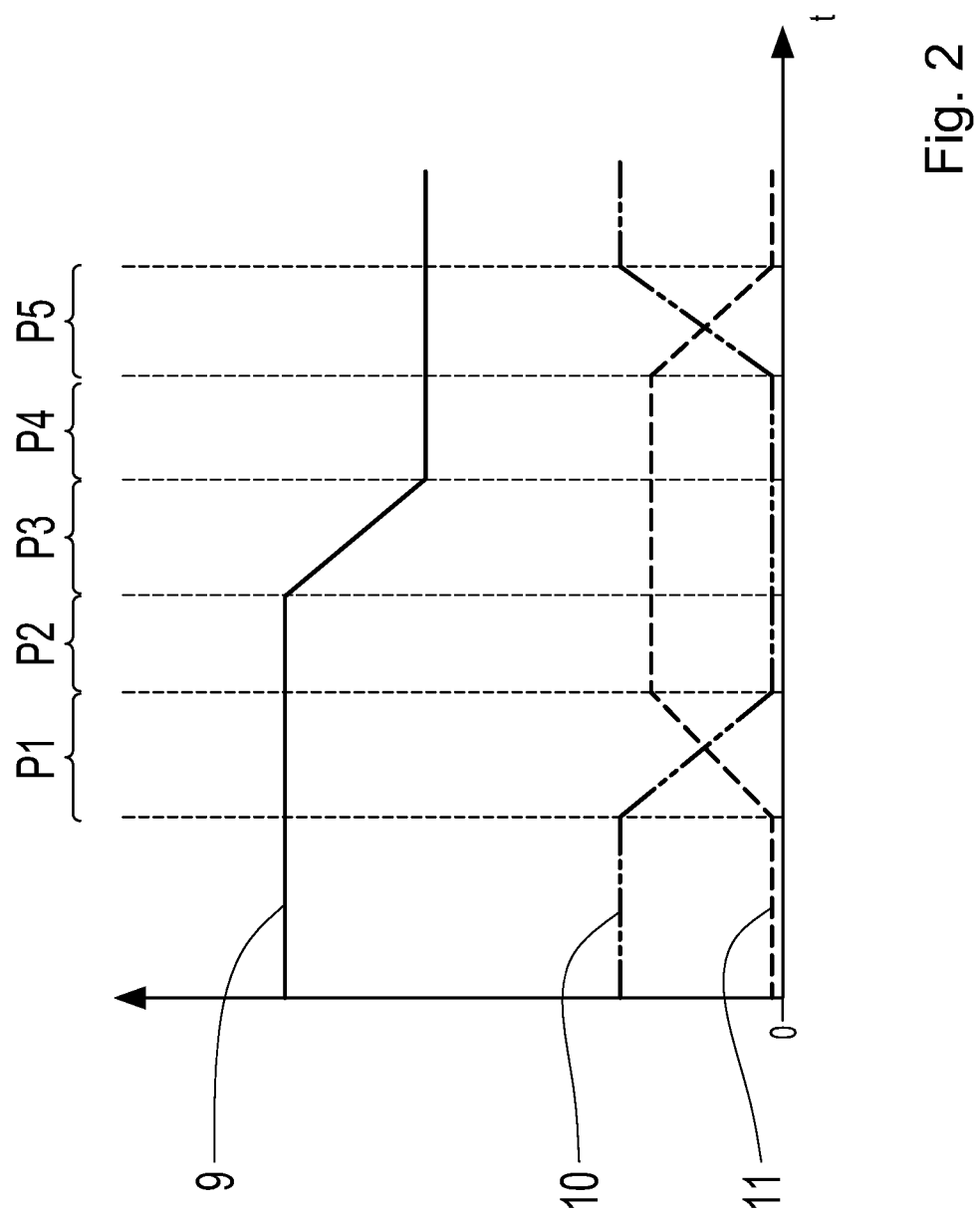

GEAR-SHIFTING METHOD FOR AN ELECTRIC DRIVE SYSTEM

FIELD OF THE INVENTION

The invention relates generally to a gear change method for an electric transmission system which includes an electric machine, a multi-stage transmission having interruption of tractive force and being drivingly connected downstream from the electric machine, and at least one brake for braking a vehicle wheel.

The invention also relates generally to an electric transmission system having such a gear change method. In addition, the invention relates generally to an electric vehicle including the electric transmission system.

BACKGROUND

Electric vehicles are known from the prior art, which include an electric transmission system having a fixed ratio. This means, only one single gear is implementable by the electric transmission system. These types of electric vehicles have a simple design and comfortable handling characteristics. It is disadvantageous, however, that, with respect to the selection of the ratio, a compromise must be found between the tractive force during the starting operation and the possible final speed. In addition, the rotational speed level of an electric machine of the electric transmission system is necessarily low at slow speeds, which results in an unfavorable efficiency of the electric machine.

In addition, electric vehicles are known, in the case of which a mechanical transmission having at least two shiftable gears for an electric transmission system mitigates the above-described disadvantages. A first gear is utilized for the starting operation and for slow speeds of the electric vehicle. As a result, as compared to a single-speed transmission, an increased tractive force and a higher rotational speed level of the electric machine is implementable even at low speeds. A second gear is utilized for higher speeds of the electric vehicle, whereby an overspeed at the electric machine is avoided. An electric vehicle of this type is known from DE 10 2009 002 437 A1. In addition, an electric transmission system is known from FR 2928583 A1.

With respect to electric vehicles which include a transmission having interruption of tractive force, it is disadvantageous that the electric machine is decoupled from the output shaft for the time period of the gear shift and cannot provide a drive torque or a brake torque. Powershift transmissions including frictional shift elements or even continuously variable transmissions can change the ratio under load. These transmissions have efficiency disadvantages, however, and are expensive.

In the case of electric vehicles which are operable, in particular exclusively, autonomously, the comfort disadvantage of the gear shift with an interruption of tractive force is mitigated, due to the fact, for example, that the gear shifts in driving phases are implemented with low tractive force and/or such driving phases are brought about without the occupants feeling disturbed. When there is no driver, but only passengers, gear shifts with an interruption of tractive force are therefore carried out largely unnoticed.

During autonomous travel, it is necessary, however, for safety reasons, that the electric vehicle be ready to be braked at any time. Conventional brakes are generally not ready for operation immediately, because the brake shoes must first pass through a short free travel before a brake torque acts on the vehicle wheel. Such free travel is necessary because undesirable drag losses would continuously occur at the brake otherwise.

One disadvantage of the above-described, known electric transmission systems is that the electric machine cannot bring about a vehicle deceleration during the gear shift.

The problem addressed by the invention is therefore that of providing a gear change method, with the aid of which a vehicle deceleration during a gear change operation is rapidly implementable.

SUMMARY OF THE INVENTION

The problem is solved by a gear change method for an electric transmission system which includes an electric machine or motor, a multi-stage transmission having interruption of tractive force and being drivingly connected downstream from the electric machine, and at least one brake for braking a vehicle wheel, which is characterized in that the brake is transferred from an inoperative condition into a readiness condition during a gear change operation of the transmission.

The gear change method according to the invention has the advantage that the brake, rather than the electric machine, exerts a brake torque on the vehicle wheel. Therefore, a rapid vehicle deceleration is achievable with the aid of the brake when braking becomes necessary during the gear change operation. In particular, a spontaneous braking intent is implementable, without delay, with the aid of the brake when this is not possible with the aid of the electric machine due to the gear change operation in the transmission. The rapid braking effect is possible because the brake is in the readiness condition.

In the inoperative condition, brake torque, which brings about a vehicle deceleration, is not applicable at the vehicle wheel by the brake. This is not possible because there is a distance between a brake disk of the brake and a brake lining of the brake, which must be overcome. In the readiness condition, the brake is prepared for initiating a braking operation. The brake in the readiness condition applies a brake torque to the vehicle wheel faster than when the brake is in the inoperative condition. The brake components in the readiness condition are adjustable such that a very low brake torque acts on the vehicle wheel. Alternatively, the brake components in the readiness condition are adjustable such that torque does not quite act on the vehicle wheel.

The electric machine consists at least of a stator and a rotatably mounted rotor and is configured for converting electrical energy into mechanical energy in the form of rotational speed and torque when operated as a motor and for converting mechanical energy into electrical energy in the form of current and voltage when operated as a generator.

During an interruption of tractive force, the torque made available by the electric machine is not transmittable to the vehicle wheels. This is the case, for example, when a shift element is disengaged and, therefore, the power flow between the electric machine and the vehicle wheels is interrupted.

In one particular embodiment, the brake is transferable into the readiness condition when no gear is engaged in the transmission. Therefore, the vehicle wheel is braked in an easy way even during shift conditions in which no gear is engaged and, therefore, no torque is generated by the electric machine. Alternatively, the brake is transferable into the readiness condition when a gear shift is carried out in the transmission.

The gear change operation can include a load reduction at the electric machine, wherein the brake is transferred into the readiness condition during the load reduction. The transfer into the readiness condition takes place simultaneously with the load reduction. The load reduction at the electric machine is the latest possible point in time for transferring the brake into the readiness condition. Thus, the electric machine fulfills a spontaneous braking intent even during the load reduction because the gear for the electric machine is still engaged. This means, during the load reduction, the brake is not yet required in order to apply a brake torque.

In addition, the gear change operation can also include the following further steps which are carried out after the load reduction. After the load reduction, the engaged gear is disengaged by disengaging a first shift element. Starting at this point in time, there is an interruption of tractive force between the electric machine and the vehicle wheels. Thereafter, a synchronization, in particular, an active synchronization of a second shift element takes place. In particular, the second shift element is synchronized with the aid of the electric machine. Thereupon, the new gear is engageable by engaging the second shift element. In this case, the brake is in the readiness condition, at the latest, upon conclusion of the load reduction. In addition, the brake is in the readiness condition during the above-described further steps of the gear change operation.

The gear change operation can also include a load build-up at the electric machine, wherein the brake is transferred from the readiness condition into the basic condition during the load build-up. The load build-up takes place after the engagement of the new gear. The load build-up at the electric machine is the earliest possible point in time for the disengagement of the brake. This is the case because the electric machine fulfills a spontaneous braking intent during the load build-up because the new gear for the electric machine is already engaged and, therefore, a braking procedure is implementable by the brake.

In order to transfer the brake out of the inoperative condition into the readiness condition, at least one manipulated variable of the brake is changed. In one embodiment, the manipulated variable is an actuating travel of a brake component, such as a brake piston or a brake shoe. In particular, the brake piston or the brake shoe is adjustable such that a brake lining rests against the brake disk. This makes it possible for a brake torque to be applied by the brake without delay, as necessary. In another embodiment, the manipulated variable is alternatively or additionally the level of a brake pressure. The brake pressure is the pressure which is present at the brake piston or the pressure in a wheel brake cylinder or drum brake. By changing the brake pressure, it is ensured, during a braking procedure, that the brake pressure required for the braking procedure becomes available faster.

In the readiness condition, a brake torque acting on the vehicle wheel is applied by the brake immediately or very rapidly. Preferably, the brake is in the readiness condition for the shortest possible time. As a result, the lost energy is low because drag torques at the brake, which result from the contact of the brake lining with the brake disk, occur for only a short time.

In one particular embodiment, a vehicle acceleration is ascertained. This takes place by determining a change in the vehicle speed. In particular, the vehicle acceleration is ascertained when the brake is in the readiness condition. The manipulated variable of the brake, in particular, the level of the brake pressure and/or the actuating travel of the brake component, is changed depending on the vehicle acceleration. By adapting the manipulated variable to the vehicle acceleration, a brake torque acting on the vehicle wheel is very rapidly applicable. In addition, a brake torque already acting in the readiness condition is prevented from becoming too great and, therefore, high losses are prevented.

The brake is transferable into the readiness condition during the gear change operation when an obstacle is detected with the aid of a detection system. The detection system includes one or several sensors. Therefore, the transfer of the brake into the readiness condition during a gear change operation takes place, in particular, exclusively, when the electric vehicle is moving in potentially unsafe surroundings, for example, in heavy traffic and/or in an area in which many obstacles, such as parked cars, persons, etc., are located. Provided it is ascertained with the aid of the detection system that no potential obstacle is located in a wide area ahead of the electric vehicle, the brake is not transferred into the readiness condition. This offers the advantage that no power loss occurs at the brake, which would result from the contact of the brake lining with the brake disk. In addition, no energy is required in order to move the brake component, for example.

The transmission provides at least two, in particular, precisely two gears. In this case, the gear change operation takes place in a transmission having an interruption of tractive force. Advantages of this type of transmission are that it is manufactured at low cost and has a good efficiency.

Of particular advantage is an electric transmission system in which a gear change method according to the invention is carried out. The electric transmission system includes a single electric machine.

In addition, an electric vehicle including an electric transmission system is advantageous. In this case, the electric vehicle exclusively includes an electric transmission system. An electric vehicle including an exclusive electric transmission system is a vehicle in which the propulsion takes place exclusively with the aid of the electric machine. This means, the electric vehicle does not include an internal combustion engine. The electric vehicle is operable, in particular, exclusively, autonomously.

BRIEF DESCRIPTION OF THE DRAWINGS

The subject of the invention is schematically represented in the figures and is described in the following with reference to the figures, wherein identical or identically operating elements are mostly provided with the same reference characters. Wherein:

FIG. 2 shows a shift sequence during a gear change operation.

DETAILED DESCRIPTION

Figure 1:
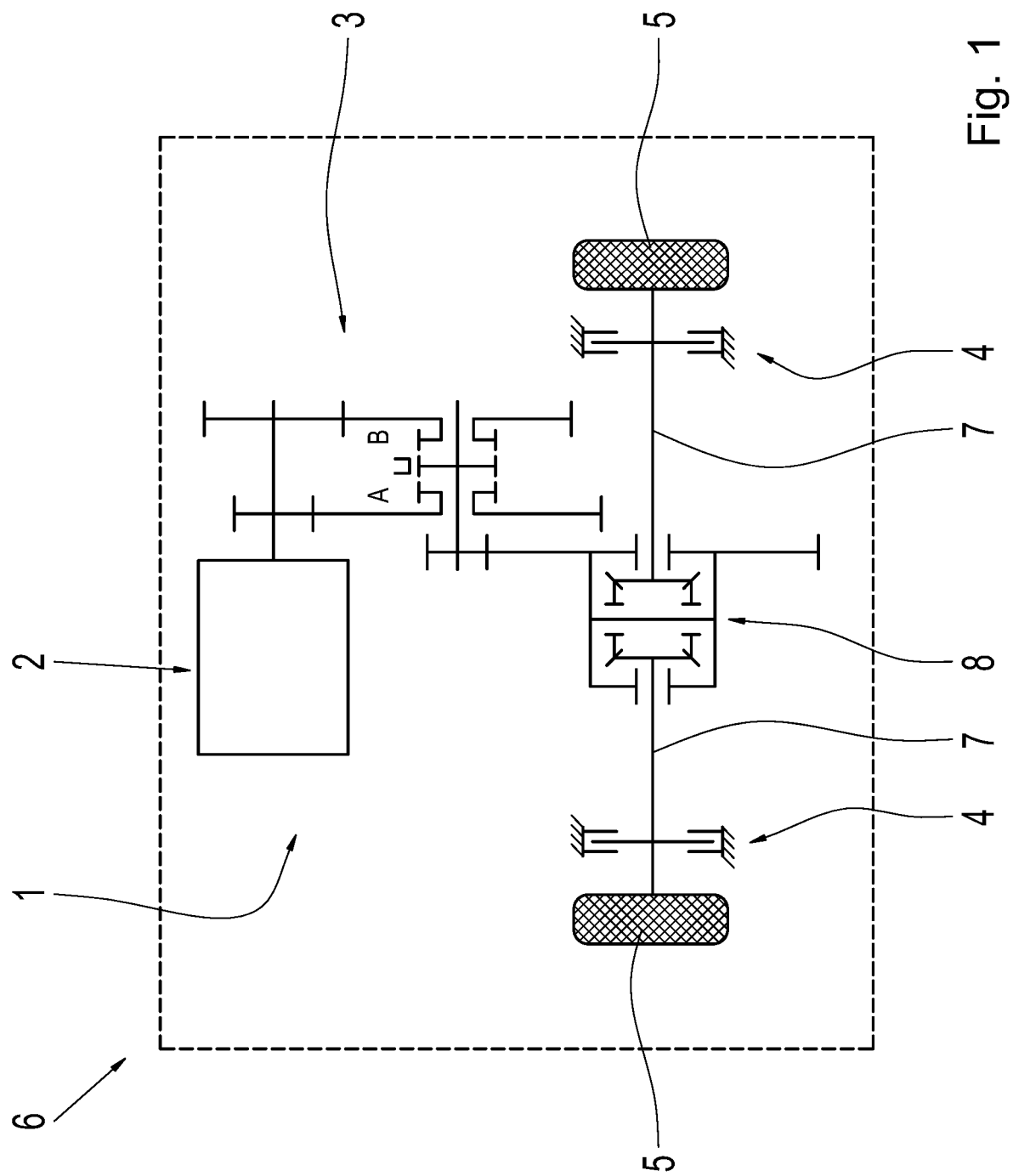
FIG. 1 shows a schematic of one portion of an electric vehicle according to the invention, including an electric transmission system according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a portion of an electric vehicle 6. The electric vehicle 6 includes an electric transmission system 1 which includes an electric machine 2, a transmission 3, and brakes 4 for braking vehicle wheels 5. The electric machine 2 is drivingly connected to the transmission 3, wherein the transmission 3 is drivingly connected downstream from the electric machine 2. In the embodiment represented in FIG. 1, the brakes 4 are associated with an axle 7 which is drivable with the aid of the electric machine 2. The gear change method according to the invention functions in the same way when the brakes 4 are arranged on another axle which is not drivable with the aid of the electric machine 2.

The transmission 3 includes a differential gear 8, with the aid of which the electric machine 2 is drivingly connected to vehicle wheels 5. The vehicle wheels 5 are drivingly connected to the axle 7. In this case, one brake 4 is assigned to each vehicle wheel 5.

The transmission 3 is a two-speed transmission including two spur gear stages. In order to implement the two gears, the transmission 3 includes a first shift element A and a second shift element B, which form a double shift element. In this case, a first gear is implemented when the first shift element A is engaged and the second shift element B is disengaged. A second gear is implemented when the first shift element A is disengaged and the second shift element B is engaged. The first shift element A and the second shift element B are form-fit shift elements.

FIG. 2 shows a shift sequence during a gear change operation. In particular, FIG. 2 shows a shift sequence during a gear change from the first gear into the second gear of the transmission shown in FIG. 1. In FIG. 2, the rotational speed curve 9 of the electric machine 2, the torque curve 10 of the electric machine 2, and the curve of the manipulated variable 11 of the brake 4 over the time t are represented. The manipulated variable 11 is, for example, an actuating travel of a brake component, such as a brake shoe or a brake piston. The manipulated is alternatively the curve of a brake pressure.

The shift sequence during the gear change operation includes five phases P1 to P5. Before a first phase P1, the brake 4 is in an inoperative condition in which a brake torque acts on the vehicle wheel 5 associated with the brake 4. In the first phase P1, a load reduction takes place at the electric machine 2, which is the beginning of the interruption of tractive force. Simultaneously, the brake 4 is transferred into a readiness condition. For this purpose, the brake component is displaced in order to reduce the distance between the brake component and a brake disk. Depending on the design of the brake, alternatively or additionally, a low brake pressure is built up. At the end of the first phase P1, the brake 4 is in the readiness condition.

In a second phase P2, the present gear is disengaged by disengaging the first shift element A. In order to disengage the gear, a shift actuator, which is not represented in the figures, is moved. In a third phase P3, an active synchronization of the second shift element B takes place with the aid of the electric machine 2. In a fourth phase P4, the new gear is engaged. In order to engage the gear, the shift actuator (not represented) is moved. For this purpose, the second shift element B is engaged. The brake 4 is in the readiness condition in the second to fourth phases P2 to P4.

In a fifth phase P5, a load build-up of an electric machine 2 takes place, whereby the interruption of tractive force is ended. Simultaneously, the brake 4 is transferred from the readiness condition into the inoperative condition. After the fifth phase, the brake 4 is in its basic condition again.

Modifications and variations can be made to the embodiments illustrated or described herein without departing from the scope and spirit of the invention as set forth in the appended claims.

REFERENCE CHARACTERS 1 electric transmission system
2 electric machine
3 transmission
4 brake
5 vehicle wheel
6 electric vehicle
7 axle
8 differential gear
9 rotational speed curve
10 torque curve
11 manipulated variable of the brake
A first shift element
B second shift element
t time
P1 first phase
P2 second phase
P3 third phase
P4 fourth phase
P5 fifth phase

The invention claimed is:

1. A gear change method for an electric transmission system (1), the electric transmission system (1) comprising an electric machine (2), a multi-stage transmission (3) drivingly connected downstream from the electric machine (2) and configured for interruption of tractive force, and at least one brake (4) for braking a vehicle wheel (5), the method comprising:
   transferring the brake (4) out of an inoperative condition into a readiness condition during a gear change operation of the transmission (3),
   wherein the brake (4) does not decelerate the vehicle wheel (5) in the inoperative condition, the brake (4) decelerates the vehicle wheel (5) during a braking operation, the brake (4) is adjustable into the braking operation from both the inoperative condition and the readiness condition, and the brake (4) is adjustable into the braking operation more quickly from the readiness condition than from the inoperative condition, and
   wherein the transmission (3) decouples the electric machine (2) from the vehicle wheel (5) during the gear change operation of the transmission (3) in order to interrupt the tractive force and power flow between the electric machine (2) and the vehicle wheel (5).

2. The gear change method of claim 1, wherein the transfer of the brake (4) into the readiness condition is carried out when no gear is engaged in the transmission (3) or when a gear shift is carried out.

3. The gear change method of claim 1, wherein the gear change operation comprises reducing a load at the electric machine (2), and wherein the transfer into the readiness condition is carried out during the load reduction.

4. The gear change method of claim 3, wherein the gear change operation further comprises:
   disengaging an engaged gear by disengaging a first shift element after the load reduction;
   synchronizing a second shift element after disengaging the engaged gear; and
   engaging a new gear by engaging the second shift element after synchronizing the second shift element, wherein the brake is in the readiness condition during the disengaging of the engaged gear, the synchronizing of the second shift element, and the engaging of the new gear.

5. The gear change method of claim 1, wherein the gear change operation comprises performing a load build-up at the electric machine (2), and wherein the brake (4) is transferred from the readiness condition into the inoperative condition during the load build-up.

6. The gear change method of claim 1, wherein at least one manipulated variable of the brake (4) is changed in order to transfer the brake (4) into the readiness condition.

7. The gear change method of claim 6, wherein the manipulated variable is an actuating travel of a brake component.

8. The gear change method of claim 6, wherein a vehicle acceleration is ascertained and the manipulated variable of the brake (4) is changed depending on the vehicle acceleration.

9. The gear change method of claim 1, wherein the brake (4) is transferred into the readiness condition during the gear change operation when an obstacle is detected with the aid of a detection system.

10. An electric transmission system (1) configured to perform the gear change method of claim 1.

11. An electric vehicle (6), comprising the electric transmission system (1) of claim 10.

12. The gear change method of claim 1, wherein the multi-stage transmission (3) is a two-speed transmission.

13. The gear change method of claim 1, wherein a brake disk of the brake (4) and a brake lining of the brake (4) are spaced apart in the inoperative condition.

14. The gear change method of claim 13, wherein the brake disk of the brake (4) and the brake lining of the brake (4) are spaced further apart in the inoperative condition than in the readiness condition.

15. The gear change method of claim 1, an internal combustion engine is not connected to the electric transmission system (1), and the electric transmission system (1) is configured for electric propulsion only.

16. The electric vehicle (6) of claim 11, wherein the electric vehicle (6) does not include an internal combustion engine.

* * * * *